United States Patent [19]

Lund

[11] Patent Number: 5,130,906
[45] Date of Patent: Jul. 14, 1992

[54] FLUSH MOUNTED VISOR LIGHT

[75] Inventor: David M. Lund, Andover, Minn.

[73] Assignee: Lund Industries, Incorporated, Minneapolis, Minn.

[21] Appl. No.: 591,663

[22] Filed: Oct. 5, 1990

[51] Int. Cl.⁵ .............................................. B60Q 1/26
[52] U.S. Cl. .................................. 362/80.1; 362/74; 362/220; 296/95.1; 296/97.1; D12/191
[58] Field of Search ................. 362/61, 80, 80.1, 83.3, 362/74, 267, 220; 296/152, 97.1, 95.1; 160/370.2; D12/191

[56] References Cited

U.S. PATENT DOCUMENTS

| | | |
|---|---|---|
| D. 85,241 | 9/1931 | Henderson . |
| D. 154,735 | 8/1949 | Arbid . |
| D. 154,861 | 8/1949 | Maher . |
| D. 156,479 | 12/1949 | Birgman . |
| D. 157,555 | 3/1950 | Abrams . |
| D. 159,062 | 6/1950 | Hallstead . |
| D. 159,144 | 6/1950 | Dieterich . |
| D. 239,705 | 4/1976 | Lund . |
| D. 252,680 | 8/1979 | Kingsley . |
| D. 261,500 | 10/1981 | Butler . |
| D. 273,672 | 5/1984 | Lund . |
| D. 283,611 | 4/1986 | Kingsley . |
| D. 288,309 | 2/1987 | Lund . |
| D. 288,310 | 2/1987 | Lund . |
| D. 291,295 | 8/1987 | Lund . |
| D. 299,713 | 2/1979 | Dunham . |
| D. 301,028 | 5/1989 | Buck . |
| D. 301,450 | 6/1989 | Kingsley . |
| D. 304,819 | 11/1989 | Chapman et al. ............... D26/34 |
| D. 312,238 | 11/1990 | Lund . |
| 2,475,901 | 7/1949 | Kipp . |
| 2,534,763 | 12/1950 | Flavin . |
| 2,566,934 | 9/1951 | Dieterich . |
| 2,567,501 | 9/1951 | Zein . |
| 2,599,809 | 6/1952 | Branch . |
| 2,777,732 | 1/1957 | Walsh . |
| 3,214,216 | 10/1965 | Brown . |
| 3,678,635 | 7/1972 | Vapi et al. ....................... 362/80 |
| 3,728,537 | 4/1973 | Barenyi et al. ................... 362/74 |
| 4,018,472 | 4/1977 | Mason, Jr. . |
| 4,149,749 | 4/1979 | Canal . |
| 4,219,870 | 8/1980 | Hardden et al. ................ 362/226 |
| 4,320,919 | 3/1982 | Butler . |
| 4,412,698 | 11/1983 | Kingsley . |
| 4,726,619 | 2/1988 | Haupestael ..................... 296/95.1 |
| 4,758,040 | 7/1988 | Kingsley . |
| 4,819,136 | 4/1989 | Ramsey ........................... 362/267 |
| 4,842,320 | 6/1989 | Kingsley . |
| 4,966,404 | 10/1990 | Lund . |

FOREIGN PATENT DOCUMENTS 829154 2/1960 United Kingdom .

OTHER PUBLICATIONS

Volra GM Heavy Truck Corporation publication, 8 pages, copyright 1987, (Exhibit D).
Custom Form Mfg., Inc. publication, entitled "Accessory Family for Light Trucks", 4 pages, no publication date, (Exhibit E).
Hot Rod, p. 96, dated Aug. 1975 (Exhibit A).
Deflecta-Shield Corporation publication, 4 pages entitled "Hot Fiberglass Products", (Exhibit B), no publication date.
Deflecta-Shield Corporation advertisement 1 page, entitled "Hot Glass" Truck Accessories (Exhibit C.), no publication date.

Primary Examiner—Stephen F. Husar
Attorney, Agent, or Firm—Philip P. Caspers; Merchant, Gould, Smith Edell, Welter & Schmidt

[57] ABSTRACT

A truck mounted visor (1) containing a plurality of illumination sources (7, 8, 9, 11, 12). The illumination sources are flush mounted within the visor leading edge (6). Each light (7, 8, 9, 11, 12) is mounted within a cavity (26), and includes a bulb (13), socket (14) and mounting bracket (15).

17 Claims, 6 Drawing Sheets

FLUSH MOUNTED VISOR LIGHT

BACKGROUND OF THE INVENTION

1. Field of the Invention

The present invention relates generally to an improved method and apparatus for providing a source of illumination used in conjunction with a vehicle mounted visor. In particular, the present invention includes a flush mounted light mounted within the visor.

2. Description of Related Technology

The use of windshield visors for trucks and other motor vehicles is well known. An illustrative embodiment of such a device is shown, for example, in U.S. Pat. No. 288,309, which discloses a visor which is mounted on the roof of a motor vehicle, preferably near the forward portion of the roof. The visor typically extends beyond the forward edge of the roof line, thereby extending above and beyond the plane of the windshield. Such a visor offers numerous advantages, including protection of the windshield from sun and rain, thereby improving visibility through the windshield for occupants of vehicle. Depending on the design of the visor, other benefits may include providing a mounting surface for vehicle accessories, such as a horn or a light.

An example of a windshield visor including means for illumination is disclosed in U.S. Pat. No. 273,672. Previous visors that include lights have suffered from numerous problems, including a failure to direct substantially all of the light in a forward direction, promoting increased aerodynamic drag, and being located behind the visor leading edge, thereby preventing illumination of the area immediately in front of the visor. An example of a commercially available visor, which includes lights mounted on the leading edge of the visor, is the "suncap sunvisor", manufactured by the Deflecta-Shield Corporation of Corydon, Iowa.

SUMMARY OF THE INVENTION

The present invention addresses some of the shortcomings of prior art devices by providing a source of illumination that is countersunk or flush mounted with the leading edge of the visor, the lights thereby substantially conforming to the original shape of the visor such that there is no additional contribution to aerodynamic drag. Accordingly, a visor is provided with a substantially continuous leading edge in which appropriate orifices or indentations have been provided in which a lens, or transparent or translucent pane, may be placed, behind which is mounted a light. Several such lights may be mounted on a single visor, the light itself being recessed within the visor such that substantially all of the light is projected in a forward direction and illuminates the area immediately in front of the visor and beyond. Additional advantages include a smooth surface which is much easier to clean, particularly in an automated car wash in which any sort of appendage is subject to damage. Being recessed, the lights are less vulnerable to breakage from any source, and the visor itself is easier to manufacture since it is formed substantially as a single piece. By coating the interior of the recessed light structure with a suitable reflective material, more efficient light transmission is promoted since substantially all of the light is projected forwardly. The resulting visor has greater structural integrity since it is formed as a single piece in which the light structure tends to stiffen, rather than weaken the visor. Additionally, the visor produces less wind noise when the vehicle is in motion since the protruding lights do not generate turbulent vortices in their wake, insofar as they are recessed and do not increase the visor's total wetted area.

DETAILED DESCRIPTION OF THE INVENTION

Figure 1:
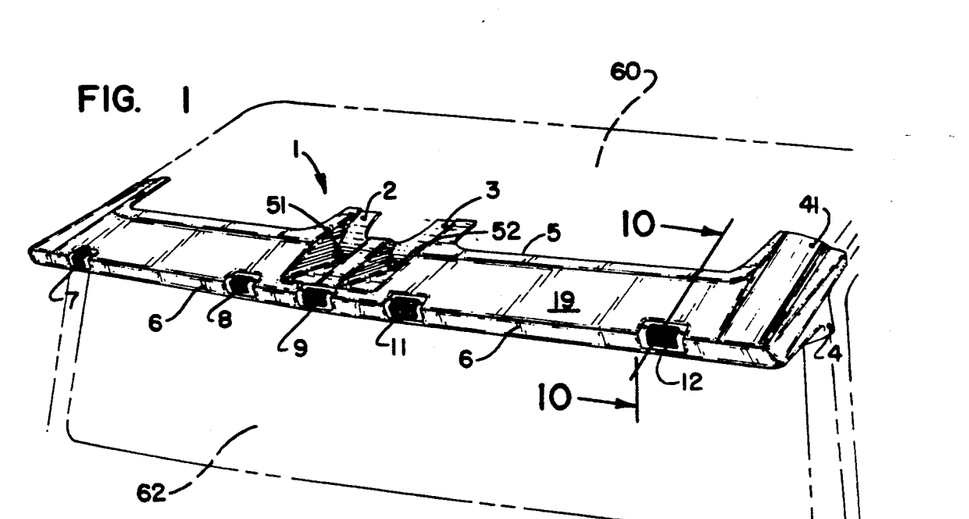
FIG. 1 is a perspective view of a first preferred embodiment of a visor constructed in accordance with the principles of the present invention showing a partial view of a motor vehicle in phantom lines to illustrate the visor relationship thereto.
Figure 2:
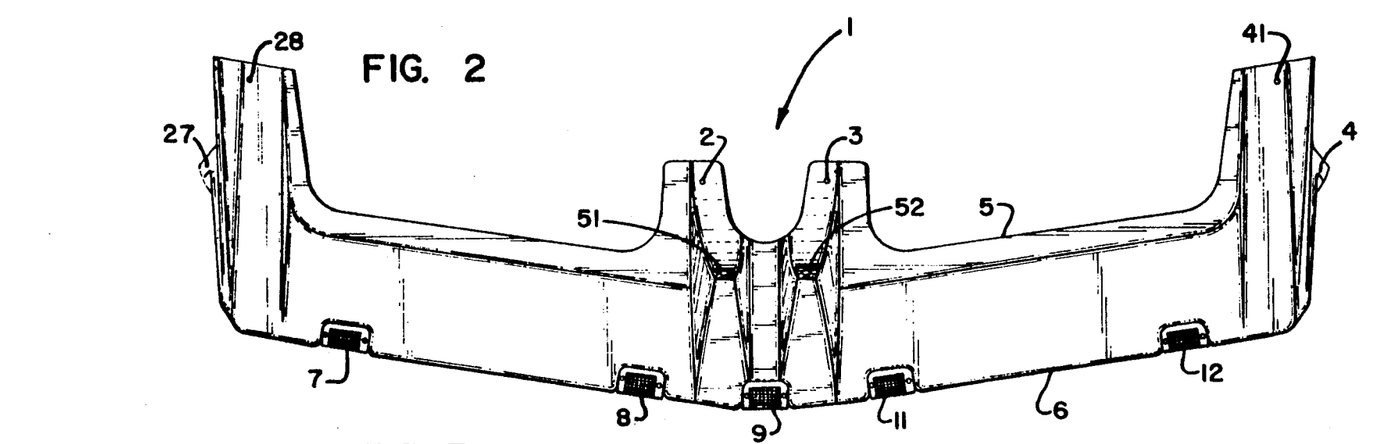
FIG. 2 is a top plan view of the visor as depicted in FIG. 1.

Referring generally to FIGS. 1 and 2, a first preferred embodiment of a visor 1 constructed in accordance with the principles of the present invention is shown. The visor 1 may be constructed of any of a variety of suitable materials, such as metals or composites. In the preferred embodiment, the visor is typically formed of a molded fiber glass material. The visor may be attached to a vehicle roof 60 by means of mounting holes 2, 3, 4, 27, 28, 41, 51 and 52 suitably located around the visor perimeter. The visor trailing edge 5 typically resides above the vehicle roof 60, with leading edge 6 protruding some distance beyond the vehicle roof so as to overhang the vehicle windshield 62, as shown in FIG. 1. A series of lights 7, 8, 9, 11 and 12 are mounted within leading edge 6 of the visor 1.

Figure 3:
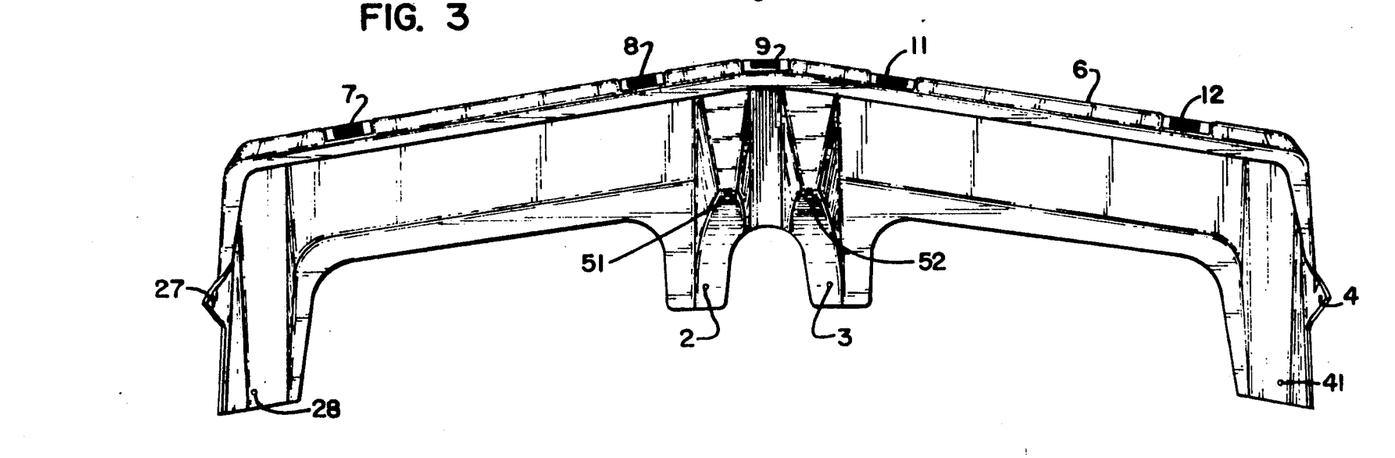
FIG. 3 is a bottom plan view of the visor as depicted in FIG. 1.
Figure 4:
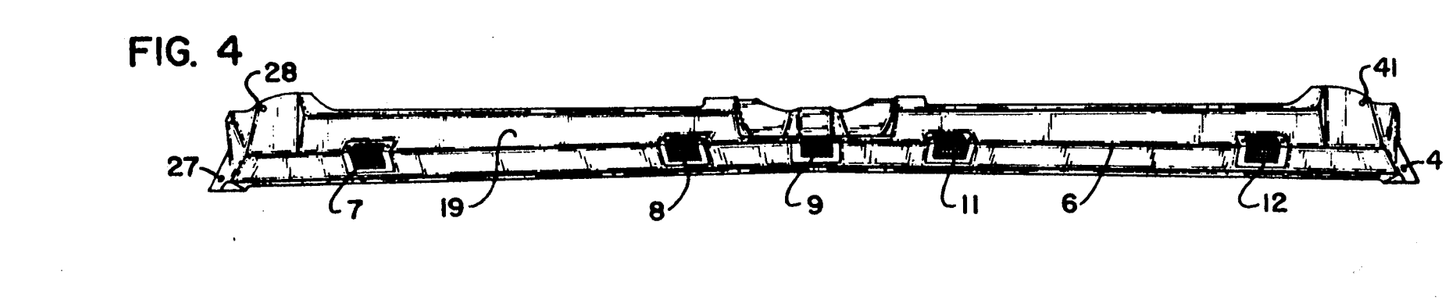
FIG. 4 is a front elevation of the visor as depicted in FIG. 1.
Figure 5:
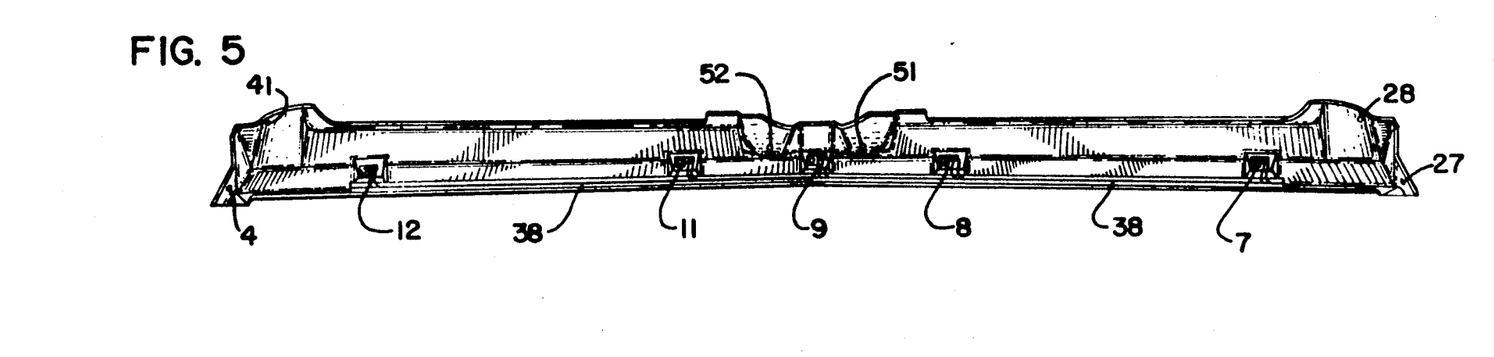
FIG. 5 is a rear elevation of the visor as depicted in FIG. 1.
Figure 6:
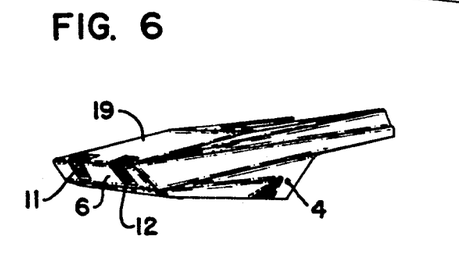
FIG. 6 is a side elevation of the visor as depicted in FIG. 1.
Figure 7:
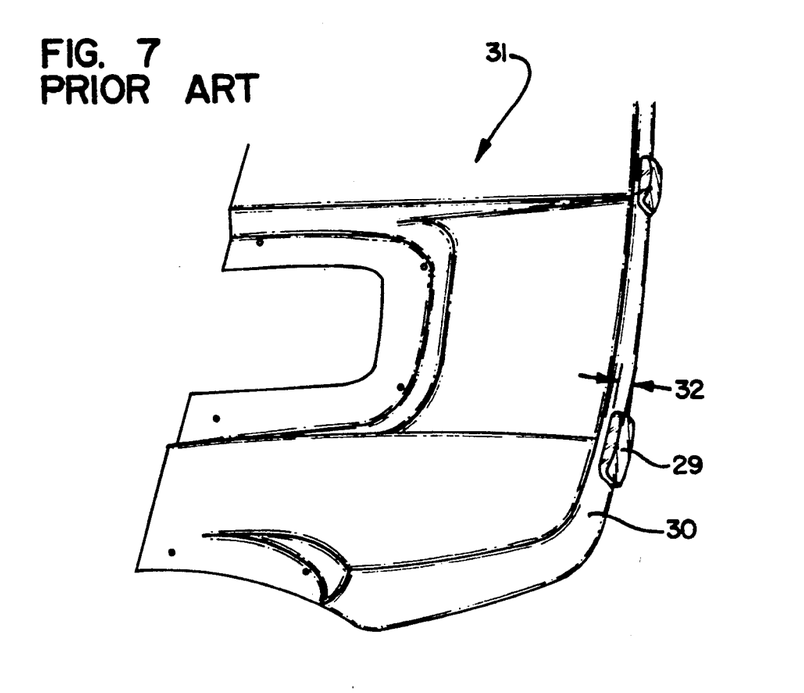
FIG. 7 is a partial perspective view of a prior art method of mounting a light on a visor.

As can be seen in FIGS. 2 and 3, the lights 7, 8, 9, 11 and 12 are mounted so as to be substantially flush with leading edge 6. In other words, the lights 7, 8, 9, 11 and 12 have a surface that conforms to the contour of leading edge 6 so as to cause a minimal discontinuity between the leading edge 6 and the lights themselves. This is in contrast to the light 29 depicted in FIG. 7, which is typical of prior art mounting arrangements. As seen in FIG. 7, the light 29 is mounted in leading edge surface 30 of visor 31, but protrudes some distance 32 beyond leading edge 30.

Figure 8:
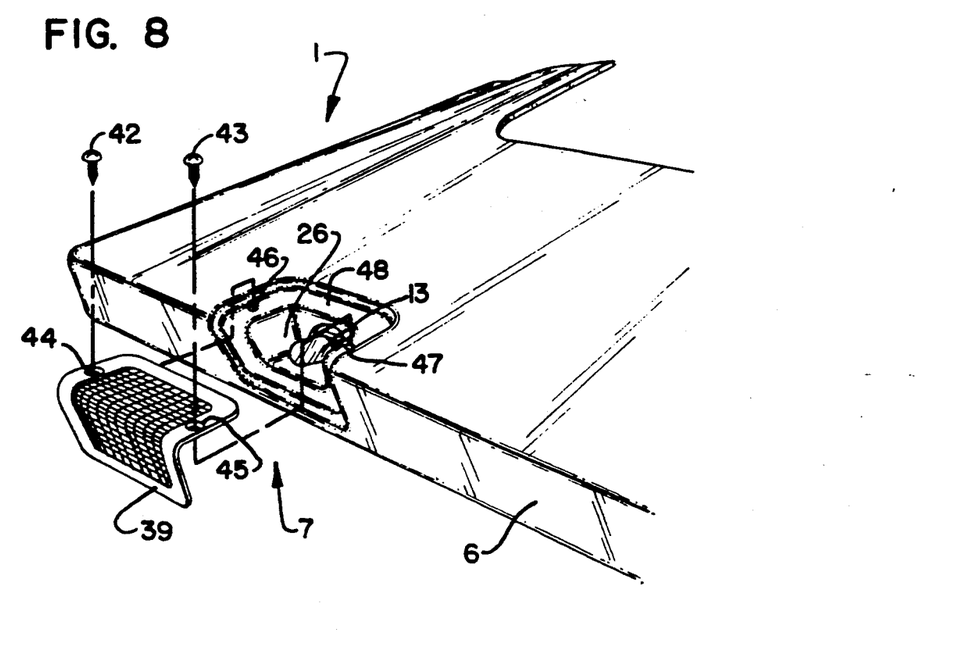
FIG. 8 is a partial exploded view of the visor as depicted in FIG. 1.
Figure 9:
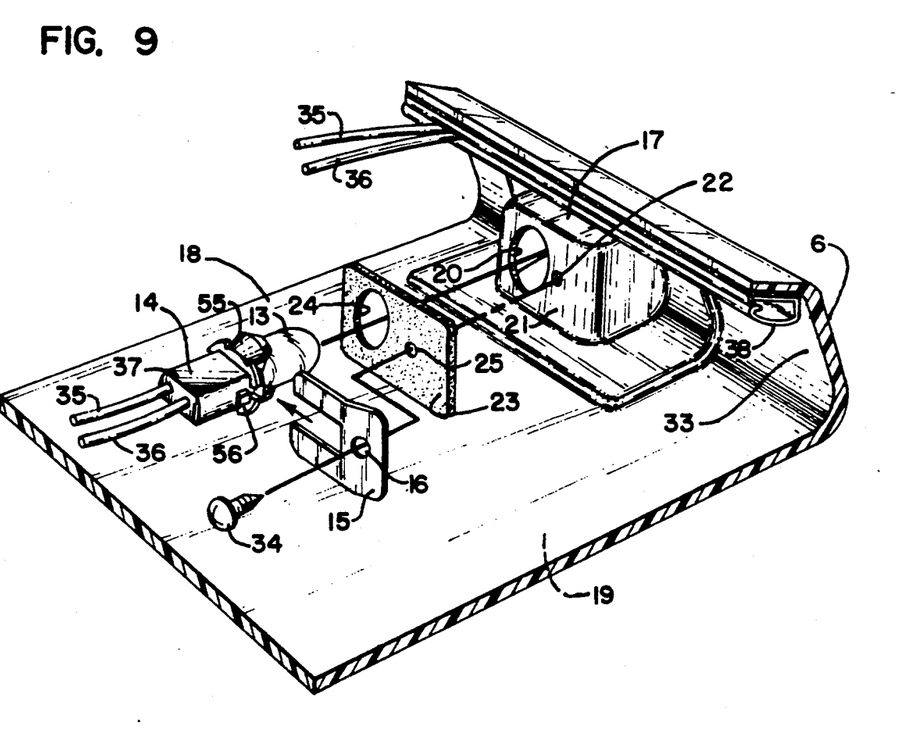
FIG. 9 is a partial exploded view of the invention as depicted in FIG. 5.
Figure 10:
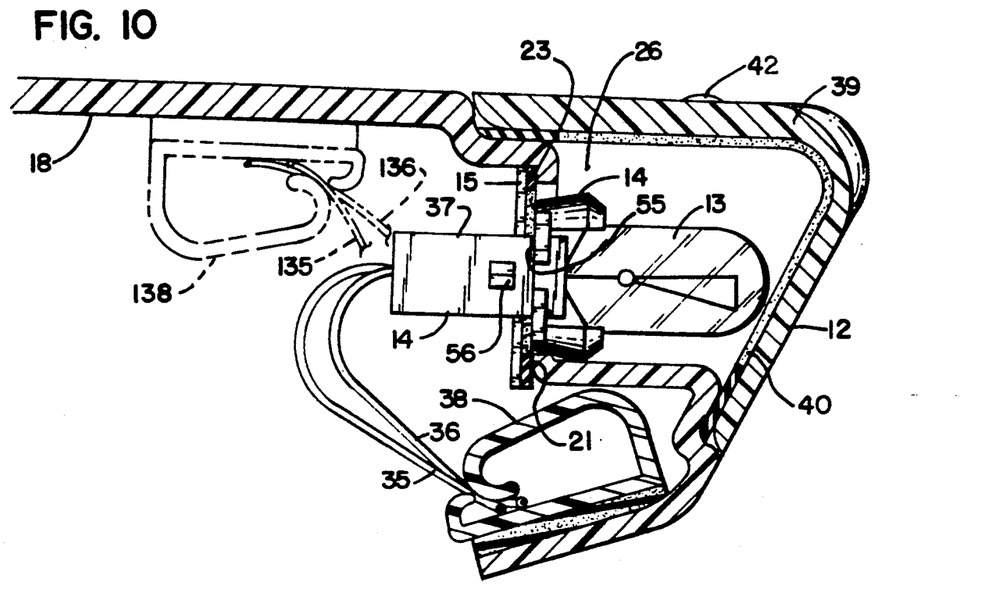
FIG. 10 is a sectional view taken along line 10—10 in FIG. 1.

Referring now to FIGS. 8, 9 and 10, the specific mounting arrangement of the lights to the visor 1 will be discussed. A bulb 13 resides within a socket 14. A C-shaped clip 15 is provided to mount the bulb 13 and socket 14 to the visor 1. The clip 15 is positioned to partially surround a portion of socket 14. Once the clip 15 is positioned around socket 14, movement of the socket 14 relative to clip 15 is restrained in a direction transverse to a plane formed by the clip 15. A shoulder portion 55 on the socket 14 and a stop 56 on the socket portion 14 engage the clip 15 to prevent the bulb 13 and 14 from moving transversely to the clip 15. A second stop 56 may be provided on socket 14 on a side opposite to the first stop 56 to permit the socket 14 to engage the clip 15 in a plurality of orientations. A mounting hole 16 is drilled or punched through clip 15 to facilitate mounting of the clip 15 to the visor 1.

A light housing 17 is mounted within visor 1, being either integrally formed with or mounted on the rear surface 33 of leading edge 6 and the bottom surface 18 of visor top 19. The housing 17 can be formed as part of the reinforced fiber glass structure of visor 1, or may be a separate metal or plastic enclosure subsequently attached to the visor. The housing 17 is of a generally rectangular shape, with a bulb opening 20 residing in the rear housing wall 21. A suitable mounting hole 22 is also placed in rear housing wall 21 to facilitate mounting of clip 15. In a preferred embodiment, clip 15 is aligned with light housing 17 such that bulb 13 may pass through bulb opening 20 as mounting hole 16 aligns with mounting hole 22. A gasket 23, with its own bulb opening 24 and mounting hole 25, is placed between clip 15 and housing rear wall 21 to prevent moisture and contaminant from entering bulb cavity 26. The clip 15, and gasket 23, are secured to housing 17 by means of self tapping screw 34.

A pair of wires 35, 36 exits the rear 37 of socket 14, being eventually routed through race or channel 38 to a suitable source (not shown) of electrical power. As shown in FIG. 10, the channel 38 is located beneath light 12. It should be noted that one alternative location for the channel 38 is adjacent the bottom surface 18 of the visor top 19 wherein the channel is above the lights. Channel 138 and wires 135 and 136, all shown in dashed lines in FIG. 10, illustrate this alternative location.

The bulb cavity 26 is itself defined and sealed along the leading edge 6 of visor 1 by means of lens 39, which is contoured to substantially match the shape of leading edge 6. A gasket 40 is placed between lens 39 and leading edge 6 to provide protection from moisture and contaminants within bulb cavity 26. The lens 39 is secured by means of self tapping screws 42,43 passing through mounting holes 44,45 within the lens 39, which are ultimately anchored to leading edge mounting holes 46, 47. The mounting holes 46, 47 reside within a recessed shelf region 48 which is offset from leading edge surface 6 by a distance substantially equal to the thickness of lens 39.

Figure 11:
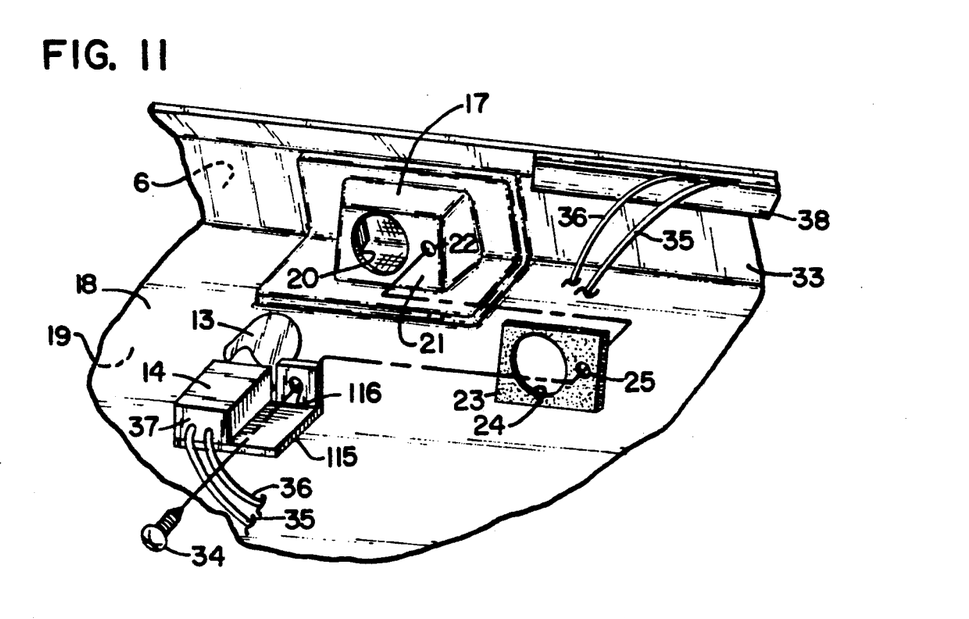
FIG. 11 is a partial exploded view of a second preferred embodiment of a visor showing a different mounting arrangement of a light on the visor.

Referring now to FIG. 11, a second preferred embodiment of a visor is shown having slightly different structure for mounting the lights to the visor. Instead of a clip 15 for mounting the bulb 13 and socket 14, a socket bracket 115 is provided. The socket 14 is permanently attached by means of, for example, an adhesive or a rivet, to socket bracket 115. Socket bracket 115 has at least one mounting hole 116 which has been formed, drilled or punched through the bracket 115. As in the first preferred embodiment shown in FIGS. 1-10, the socket bracket 115 of the second preferred embodiment, along with gasket 23, are secured to housing 17 by means of a self-tapping screw 34.

The above description is of the preferred embodiments of the invention, but it will be apparent that many modifications and variations could be achieved by one skilled in the art without departing from the spirit or scope of the novel concepts of the invention. The scope of the invention should be determined by the appended claims only.

I claim:

1. A windshield visor adapted to be mounted onto a vehicle, comprising:
    a) a body member, the body member being formed so as to include a top surface, a bottom surface, a left side, a right side, a leading edge surface and a trailing edge surface, the top surface and the leading edge surface intersecting to form an edge member; and
    b) at least one source of illumination, the source of illumination being mounted within the visor body member such that the source of illumination substantially conforms to adjacent surface contours of the visor body member, the source of illumination mounted to simultaneously project light from at least a portion of the edge member and adjacent portions of the leading edge surface and the top surface.

2. The visor of claim 1, wherein the source of illumination further comprises:
    a) a light bulb;
    b) a socket, the light bulb being mounted within the socket;
    c) mounting means for affixing the socket to the visor body member, and
    d) a lens, the lens being affixed to the visor body member such that the lens forms portions of the body member, the top surface, and the leading edge surface.

3. The visor of claim 2, wherein the body member is formed so as to contain at least one orifice, each orifice forming an opening through the edge member and a portion of the top surface and a top portion of the leading edge surface, each source of illumination being mounted so as to permit light to be emitted through the opening, and wherein the lens is affixed to the visor body member so as to substantially cover the orifice, thereby forming a cavity in a region of the visor adjacent to the edge member.

4. The visor of claim 3, wherein the light bulb resides within the cavity adjacent to the edge member.

5. The visor of claim 4, further comprising a gasket, the gasket residing between the lens and the body member, thereby providing a seal between the lens and the cavity.

6. The visor of claim 1, wherein the leading edge surface is formed to include a first substantially planar surface and the top surface is formed to include a second substantially planar surface, the first and second surfaces intersecting at an angle of between approximately 10° and 110° at the edge member.

7. The visor of claim 1, wherein the edge member is the forwardmost portion of the visor when the visor is mounted onto the vehicle.

8. A method of providing a source of illumination for a vehicle mounted visor, comprising the steps of:
    a) integrally forming at least one recessed light housing in an edge surface of the visor such that the recessed light housing has an inner perimeter and a recessed lip adjacent to the inner perimeter;
    b) placing a source of illumination within the recessed light housing of the visor such that the light is emitted from the recessed light housing; and c) affixing a substantially transparent lens to the recessed lip such that the recessed light housing in the visor edge surface is substantially sealed.

9. The method of claim 8, further comprising the step of offsetting the recessed lip from the visor edge surface of a first distance, the first distance causing the lens to be substantially flush with the visor edge surface when the lens is affixed to the visor edge surface.

10. The method of claim 9, further comprising the step of inserting a gasket between the lens and the recessed inner lip.

11. The method of claim 10, further comprising the steps of:
   a) mounting a socket within the recessed light housing; and
   b) inserting a light bulb into the socket, such that the light bulb serves as the source of illumination.

12. The method of claim 11, further comprising the steps of:
   a) forming a channel within the visor;
   b) placing at least a pair of electrically conductive wires within the channel;
   c) connecting first ends of the pair of wires to the bulb socket; and
   d) connecting second ends of the pair of wires to an electrical power source, such that electrical power can be supplied to the light bulb.

13. A truck mounted windshield visor, comprising:
   a) a visor body member having a top surface, a bottom surface, a left side, a right side, a leading edge surface, and a trailing edge surface, the visor body member including a plurality of recessed portions integrally formed with the visor body member, each of the recessed portions having an inner perimeter and an adjacent recessed lip, each of the recessed portions defining a light housing for an illumination source, each of the recessed portions being formed along at least a portion of the leading edge surface;
   b) a plurality of illumination sources, at least one of said illumination sources being positioned within each of said recessed portions; and
   c) a plurality of countersunk lenses, each lens being positioned so as to cover a corresponding recessed portion containing said at least one illumination source, each lens being formed so as to substantially conform to adjacent visor surface contours.

14. The truck mounted windshield visor of claim 13, further comprising:
   a) a cable channel;
   b) a plurality of wires, the wires being routed within the cable channel; and
   c) a plurality of wire terminations, the wire terminations being compatibly formed so as to mate with a light bulb socket and a source of electrical power.

15. The truck mounted windshield visor of claim 14, further comprising:
   a) a socket bracket, the socket bracket being rigidly affixed to an interior region of the recessed portion;
   b) a socket gasket, the socket gasket being proximal to the socket bracket;
   c) a light bulb socket, the light bulb socket being affixed to the socket bracket, the gasket being pressed between the socket, and socket bracket and the visor body member; and
   d) a light bulb, the light bulb being inserted into the light bulb socket.

16. The truck mounted windshield visor of claim 15, wherein the socket bracket further comprises a vertical member and a horizontal member, the light bulb socket being mounted on the horizontal member, the vertical member being affixed to a surface within the illumination source cavity.

17. The truck mounted windshield visor of claim 14, further comprising:
   a) a clip having a C-shape, the clip being rigidly affixed to an interior region of the recessed portion;
   b) a socket gasket, the socket gasket being proximal to the clip;
   c) a light bulb socket, the light bulb socket having a shoulder portion on one side of the clip and a stop on an opposite side of the clip, movement of the light bulb socket relative to the clip being restrained by engagement of the shoulder portion and the stop with the clip, the socket gasket being pressed between the socket, the clip and the visor body member; and
   d) a light bulb, the light bulb being inserted into the light bulb socket.

* * * * *

UNITED STATES PATENT AND TRADEMARK OFFICE
CERTIFICATE OF CORRECTION

PATENT NO. : 5,130,906

DATED : July 14, 1992

INVENTOR(S) : David M. Lund

It is certified that error appears in the above-identified patent and that said Letters Patent is hereby corrected as shown below:

On Column 1, line 28, after "U.S." insert therein --Design--.

Signed and Sealed this

Twenty-sixth Day of October, 1993

Attest:

BRUCE LEHMAN

*Attesting Officer*  *Commissioner of Patents and Trademarks*